United States Patent
Chi et al.

(10) Patent No.: US 8,346,708 B2
(45) Date of Patent: Jan. 1, 2013

(54) SOCIAL NETWORK ANALYSIS WITH PRIOR KNOWLEDGE AND NON-NEGATIVE TENSOR FACTORIZATION

(75) Inventors: Yun Chi, Santa Clara, CA (US);
Shenghuo Zhu, Santa Clara, CA (US);
Koji Hino, Cupertino, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 799 days.

(21) Appl. No.: 12/469,043

(22) Filed: May 20, 2009

(65) Prior Publication Data

US 2010/0185578 A1 Jul. 22, 2010

Related U.S. Application Data

(60) Provisional application No. 61/146,392, filed on Jan. 22, 2009.

(51) Int. Cl.
*G06F 9/44* (2006.01)
*G06N 7/02* (2006.01)
*G06N 7/06* (2006.01)

(52) U.S. Cl. .......................................................... 706/52
(58) Field of Classification Search .................. None
See application file for complete search history.

(56) References Cited

U.S. PATENT DOCUMENTS

2006/0184464 A1* 8/2006 Tseng et al. .................... 706/14

OTHER PUBLICATIONS

Chi et al. Probabilistic Polyadic Factorization and Its Application to Personalized Recommendation, CIKM'08, pp. 941-950.*
Chi et al, Probabilistic Polyadic Factorization and Its Application to Personalized Recommendation, CIKM'08, Oct. 26-30, 2008, Napa Valley, California, USA.
FitzGerald et al, Non-Negative Tensor Factorisation for Sound Source Separation, ISSC, Sep. 1, 2005, 5 pages.
Lathauwer, A Multilinear Singular Value Decomposition, Siam J. Matrix Anal. Appl., vol. 21, No. 4, pp. 1253-1278, 2000.
Shashua, et al, Non-Negative Tensor Factorization with Applications to Statistics and Computer Vision, Proceedings of the 22d Int'l Conference on Machine Learning, Bonn, Germany 2005, 8 pages.
Hazan et al, Sparse Image Coding using a 3D Non-negative Tensor Factorization, Proceedings of the Tenth IEEE International Conference on Computer Vision (ICCV'05) vol. 1-vol. 01 table of contents, pp. 50-57, 2005.
Carroll et al, Candelinc: A general Approach to Multidimensional Analysis of Many-Way Arrays with Linear Constraints on Parameters, Psychometrika—vol. 45, No. 1, Mar. 1980, 22 pages.

* cited by examiner

*Primary Examiner* — Jeffrey A. Gaffin
*Assistant Examiner* — Li-Wu Chang
(74) *Attorney, Agent, or Firm* — Joseph Kolodka; Bao Tran

(57) ABSTRACT

Systems and methods are disclosed to analyze a social network by generating a data tensor from social networking data; applying a non-negative tensor factorization (NTF) with user prior knowledge and preferences to generate a core tensor and facet matrices; and rendering information to social networking users based on the core tensor and facet matrices.

20 Claims, 3 Drawing Sheets

Figure 1:
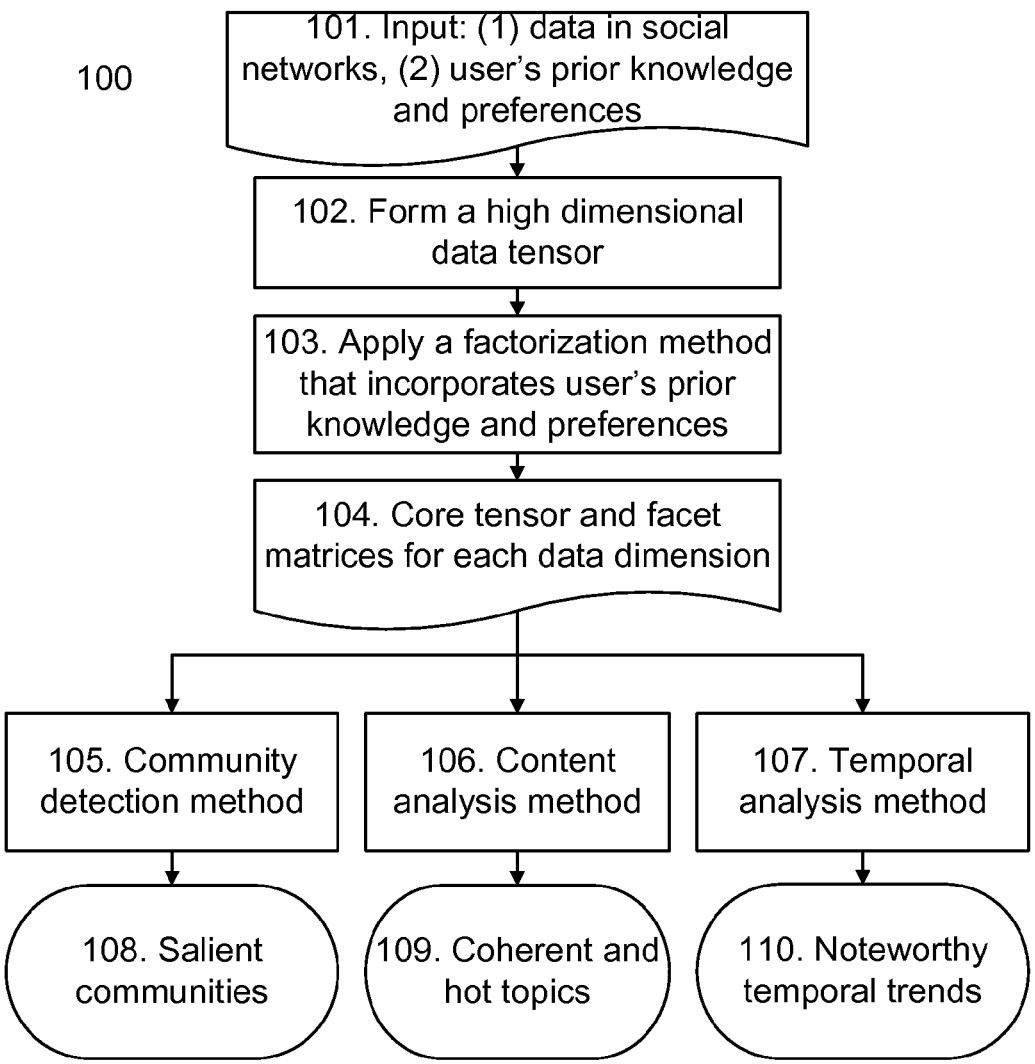

SOCIAL NETWORK ANALYSIS WITH PRIOR KNOWLEDGE AND NON-NEGATIVE TENSOR FACTORIZATION

This application claims priority to U.S. Provisional Application Ser. No. 61/146,392 filed Jan. 22, 2009, the content of which is incorporated by reference.

BACKGROUND

This application relates to social network analysis with prior knowledge and non-negative tensor factorization.

Social networking is a concept that has been around much longer than the Internet or even mass communication. People have always been social creatures; our ability to work together in groups, creating value that is greater than the sum of its parts, is one of our greatest assets. The social networking model has recently adapted to the World Wide Web. The Web model has changed from top-down to bottom-up creation of information and interaction, made possible by new Web applications that give power to users. While in the past there was a top-down paradigm of a few large media corporations creating content on the Web for the consumers to access, the production model has shifted so that individual users now create content that everyone can share. While the Web has functioned as an information repository, the advent of social networks is turning the Web into a tool for connecting people.

One issue in running social networks is the size of data generated. Data in many applications are polyadic, i.e., they have multiple dimensions. Data in social networks are such an example—for example, data in the blogosphere may have people dimension (the author of a blog post), content dimension (the body of the post), and time dimension (the timestamp of the post). Documents in a digital library are another example—a scientific paper can be described by its authors, keywords, references, publication date, publication venue, etc. To analyze such polyadic data, a very important task is to extract significant characteristics from different data dimensions, where the extracted characteristics can be used either directly for data summarization and visualization or as features for further data analysis. The extracted characteristics can be in the form of, using the blog example, salient communities among bloggers, coherent topics in blog posts, and noteworthy temporal trends of these topics and communities. Because these data dimensions affect each other in a joint way, approaches that either analyze each data dimension independently or only consider pairwise relations between data dimensions are not able to accurately capture the data characteristics.

Several multiple-dimensional tensor models have been proposed to capture the higher-order correlation (other than the second order correlation) among various data dimensions. These tensor-based approaches can be categorized into two groups. Approaches in the first group decompose polyadic data by using higher-order linear decompositions, which are extensions of the matrix singular value decomposition. On the other hand, approaches in the second group decompose polyadic data by using non-negative tensor factorizations (NTFs), which are extensions of the non-negative matrix factorization (NMF).

Non-negative tensor factorization is a relatively new technique that has been successfully used to extract significant characteristics from polyadic data, such as data in social networks. Because these polyadic data have multiple dimensions, NTF fits in naturally and extracts data characteristics jointly from different data dimensions. In the standard NTF, all information comes from the observed data and end users have no control over the outcomes. However, in many applications very often the end users have certain prior knowledge and therefore prefer the extracted data characteristics being consistent with such prior knowledge.

The approaches based on NTFs decompose data into additions of non-negative components and therefore have many advantages over those based on linear decompositions. Such advantages include ease of interpretation of the extracted characteristics, close connection to the probabilistic models, and no enforcement on the orthogonality among different data characteristics.

In an approach based on the standard NTF for extracting data characteristics, the extracted characteristics can be of arbitrary forms and end users do not have any control over them. Such an approach has some benefits—it is simple because it does not require any input other than the observed data. However, such a simple approach also has its weakness: end users have no channel to incorporate their prior knowledge into the process of characteristic extraction.

SUMMARY

Systems and methods are disclosed to analyze a social network by generating a data tensor from social networking data; applying a non-negative tensor factorization (NTF) with user prior knowledge and preferences to jointly extract a core tensor and facet matrices; and rendering information about the social network based on the core tensor and facet matrices.

Implementations of the above aspect may include one or more of the following. The system can transform the data into a high-dimensional tensor, where each dimension of the tensor corresponds to one aspect of the data. Each node of the data tensor corresponds to a dimension of the social networking data. An index for a dimension is unordered or ordered. Each data tensor entry represents an intensity of the corresponding entry in the social networking data with a fixed set of indices in the dimension. The system can apply the NTF for parameter inference and maximum likelihood estimation. Knowledge can be incorporated at different levels into the factorization to control the facets in different dimensions of the data at different levels. A plurality of levels of user inputs can be provided for each dimension of the data, including unconstrained, basis-constrained, and constant. The user input level can be set independently for each dimension of data. The system can apply a Dirichlet prior in a model parameter inference. The sparseness or smoothness of the NTF can be controlled by using special Dirichlet priors. The system can generate a model $[C, X_B^1 X^1, \ldots, X_B^N X^N]$, where $X_B^1 X^1, \ldots, X_B^N X^N$ are the factors in first, second, . . . , and N-th dimensions, C is the core tensor to capture the correlation among the factors $X_B^1 X^1, \ldots, X_B^N X^N$, wherein $X_B^1, \ldots, X_B^N$ are nonnegative and encode user prior knowledge, $X^1, \ldots, X_B^N$ are nonnegative. The loss between the data tensor and $[C, X_B^1 X^1, \ldots, X_B^N X^N]$ is the Kullback-Leibler divergence. The NTF can be used to select members of a community or select topics in the social network, or detect one or more temporal trends in the social network. The NTF can also be used for organizing, searching, classifying, clustering, or visualizing data in the social network.

In one implementation, the system determines a connection between a model and a probabilistic generative procedure. From this connection, the system uses a Dirichlet prior in the model parameter inference, where in the method the system can control the sparseness or smoothness of the results by using special Dirichlet priors.

In another implementation, prior knowledge can be incorporated at different levels into the factorization and as a result, end users can control the facets in different dimensions of the data at different levels. For example, three levels of user inputs are allowed for each dimension of the data, they are unconstrained, basis-constrained, and constant. The level of unconstrained is equivalent to the standard NTF approaches and the other levels permit user preference in different degrees. The user input level can be set independently for each dimension of data. For example, the end user can have unconstrained content dimension, basis-constrained author dimension, and fixed time dimension in the same process.

Advantages of the preferred embodiments may include one or more of the following. The system takes in to consideration the end users' preferences and extracts characteristics from the raw data only. The system ensures that the extracted characteristics to meet the end users' preferences. Compared to other state-of-the-art baseline methods, the model explicitly restricts the solution space to be within that denoted by the end users and therefore is guaranteed to extract data characteristics that meet the requirement of the end users. Because of this advantage, the model can ensure the extracted characteristics meet the end users' preferences. In addition to better serving the end users, the system provides faster operation (e.g., due to the reduced search space for the solution) and higher quality (e.g., due to the incorporation of additional prior knowledge) then state of the art systems. The system may allow the end users to control the factorization outputs at three different levels for each of the data dimensions. The framework is intuitively appealing in that it has a close connection to the probabilistic generative models.

The users' prior knowledge greatly benefits the extraction of meaningful data characteristics from different perspectives. Cognitively, human concepts such as the content topics usually only occupy a very low dimensional subspace or manifold of the whole space (which usually is of much higher dimensions) and users' prior knowledge can provide guidance toward the appropriate subspace. The use of prior knowledge can reduce overfitting. Application-wise, there are many applications in which the end users already have certain domain knowledge, e.g., a pre-constructed ontology of contents, and want to view the data through the lens of such domain knowledge. Therefore, it is beneficial to allow the end users to incorporate prior knowledge into the process of characteristic extraction.

The system can be used in tasks such as detecting salient communities, coherent topics, and noteworthy temporal trends in social networks. Other applications include organizing, searching, classifying, clustering, and visualizing the data in social networks. The system uses a highly efficient method that takes advantage of the sparseness of data, where the method has linear (per iteration) time complexity. The system also uses an efficient technique for fast computation when the application is selecting top-K answers. As discussed in the incorporated by reference Provisional Patent Application, extensive experimental studies on a paper citation data set and a blog data set demonstrate that the new framework is able to effectively incorporate users' prior knowledge, improves performance over the standard NTF on the task of personalized recommendation, and is scalable to large data sets from real-life applications.

DESCRIPTION

FIG. 1 shows an exemplary process to analyze a social network and applying the result to form a more salient social community, to identify and show relevant hot topics being discussed by the social network, or to detect interesting temporal trends for the social network.

Referring now to FIG. 1, the system receives input (101). The input of this method can include two parts. The first part is the data in the social network to be analyzed. The second part is indication on the level of constraints on each data dimension as well as the prior knowledge, provided by the end user. Next, in 102, the system constructs a data tensor from the input data obtained in 101. The data tensor is denoted by A, where each mode of A corresponds to a dimension of the input data. An index for a dimension can be either unordered, e.g., when the dimension corresponds to terms in a document, or ordered, e.g., when the dimension corresponds to the generation time of a document. Each entry of A represents the intensity of the corresponding entry in the input data with a fixed set of indices in the dimensions. The intensity can be, for example, the number of occurrences of a certain datum or some weighed measures derived from the occurrences.

In an NTF-based approach that extracts data characteristics, the first step is to construct a data tensor, where the order of the data tensor is the same as the number of dimensions of the data. Using the blogosphere as an example, a third-order data tensor $A \in R_+^{I \times J \times K}$ can be used to represent the blog data where the three dimensions of the data tensor correspond to blogger, keyword, and timestamp, respectively. Each of I, J, and K represents the size of the corresponding data dimensions. I.e., there are in total I bloggers, J keywords and K timestamps in the data. Each entry of the data tensor represents the intensity of the corresponding entry in the observed data.

Once the data tensor has been constructed, a non-negative tensor factorization is directly applied to the data tensor. The outcomes of this factorization consist of two parts. The first part is a set of facet matrices where each matrix represents the most significant characteristics of one dimension of data. More specifically, the number of facet matrices is the same as the order of the tensor and for each facet matrix, each column of the matrix indicates one facet of the corresponding dimension of data. For the blog example, the facet matrices are $X \in R_+^{I \times L}, Y \in R_+^{J \times M}$, and $Z \in R_+^{K \times N}$, where each column of X, Y, and Z denotes a salient community of bloggers, a significant topics in posts, and a noteworthy temporal trends, respectively. The second part of the NTF decomposition is a core tensor C, which has the same order as the data tensor but usually with a much smaller size. C represents the correlation among all the facets in all the data dimensions. In the blog example, $C \in R_+^{L \times M \times N}$ where L, M, and N are the number of facets in the dimensions of blogger, keyword, and timestamp, respectively.

The target of a non-negative tensor factorization is to find the core tensor C, the facet matrices X, Y, and Z, so that when put together as [C, X, Y, Z], they approximate A in an optimal way. A commonly used metric to measure the approximation error is the KL-divergence.

One variant assumes that the prior knowledge from the end users forms a subspace from which the facets can be located. To illustrate, in the blog example, each facet in the content dimension is a significant topic and in the standard NTF approaches, a topic can be formed by any combination of keywords with arbitrary weights. If the end users provide a set of sub-topics, e.g., obtained from the leaf nodes of a content ontology tree, then the framework can take these sub-topics as a basis for the content facets. That is, each facet (topic) must be a convex combination of the given sub-topics. In this case, the data dimension is basis-constrained. Another example for basis-constrained data dimension can be the time dimension. Each facet in the time dimension corresponds to a noteworthy temporal trend. According to the prior intuition, a temporal trend should be smooth instead of noise-like. One way to incorporate this prior knowledge is to form a basis consisting of Fourier series in low frequencies. Then a convex combination of this basis will not contain high frequency components and therefore the facets will be guaranteed to be smooth.

In a second variant, the end users may require the facets for certain data dimensions to be fixed. Such a requirement may sound overly restricted, but it is not uncommon in real applications. For example, from the top level nodes of an ontology tree, the user may have already determined the top-level topics such as politics, technologies, sports, etc., as well as the representation of these topics as facets. And the user's goal is to summarize the blog posts through the lens of these pre-constructed facets. As another example, in the time dimension, the user may choose to use a set of facets that correspond to the domain knowledge, i.e., concepts such as year, quarter, month, etc., to detect seasonal trends.

To summarize the above two variants as well as the third variant which corresponds to the standard NTF case, the objective function becomes in its most general form as the following $$\text{error}_{KL} = KL(A \| [C, X_B X, Y_B Y, Z_B Z]),$$

where $X_B$, $Y_B$ and $Z_B$ are given a priori whereas X, Y, Z, and C are to be computed. When $X_B$, $Y_B$ and $Z_B$ are set to identity matrices to obtain the standard NTF problem; when any of the $X_B$, $Y_B$ or $Z_B$ is given and the corresponding X, Y, or Z is to be computed, the problem is the basis-constrained data dimension; when any of the $X_B$, $Y_B$ or $Z_B$ is given and the corresponding X, Y, or Z is fixed to be an identity matrix, the problem is the fixed data dimension.

For a given $A \in R_+^{I \times J \times K}$, the following update rules converge to an optimal solution for the objective function defined above $$B \leftarrow A / [C, X_B X, Y_B Y, Z_B Z],$$

$$C \leftarrow {}_0 C \circ \langle B, [\bullet, X_B X, Y_B Y, Z_B Z] \rangle,$$

$$X \leftarrow {}_1 X \circ \langle B \times_1 X_B^T, [C, \bullet, Y_B Y, Z_B Z] \rangle,$$

$$Y \leftarrow {}_1 Y \circ \langle B \times_2 Y_B^T, [C, X_B X, \bullet, Z_B Z] \rangle,$$

$$Z \leftarrow {}_1 Z \circ \langle B \times_3 Z_B^T, [C, X_B X, Y_B Y, \bullet] \rangle.$$

where $\leftarrow_0$ denotes the operation of after all updates are completed, normalizing so that all entries sum to one, and $\leftarrow_1$ denotes the same operation except that all columns are normalized so that they sum to ones.

In 103, the process applies the factorization method that incorporates the user's prior knowledge and preferences. One embodiment of this procedure is detailed in FIG. 2. Next, in 104, the process determines factor matrices in different dimensions of the data and the correlation among the factors in the form of the core tensor. These are the output obtained by using the factorization method in 103. The factors can be interpreted as the probabilistic distribution for a given concept for a given dimension. The correlation captures the relationship among different concepts in all the dimensions.

In 105, the information from 104 can be used in methods for detecting communities. Alternatively, in 106, the information can be used for analyzing contents by using the data characteristics. In yet another application, in 107, the data characteristics obtained in 104 can be used for analyzing temporal trends. From 105, through an improved community selection, salient on line communities can be formed. In 109, the information obtained from 106 can be used to identify and display coherent and hot topics in the social network. In 110, the system can identify noteworthy temporal trends in the social network using the data obtained from 107.

The process of FIG. 1 incorporates the users' prior knowledge to enhance the extraction of data characteristics. The benefits can be of multiple-fold—the extracted characteristics can be more generalized because of the alleviation of over-fitting, they can be more reasonable because they fit users' prior knowledge, and they can meet the users' requirement when the users want to enforce the facets on certain data dimensions. To achieve these benefits, the system incorporates the users' prior knowledge in the process of decomposition. In one embodiment, the facets in a data dimension are restricted to be in a user-given subspace and in another embodiment, the facets are fixed by the user. Together with the case of unconstrained facets in the standard NTF, the system allows end users to control the process of data characteristic extraction at three different levels.

In one embodiment, prior knowledge can be incorporated at different levels into the factorization and as a result, end users can control the facets in different dimensions of the data at different levels. For example, three levels of user inputs are allowed for each dimension of the data, they are unconstrained, basis-constrained, and constant. The level of unconstrained is equivalent to the standard NTF approaches and the other levels permit user preference in different degrees. The user input level can be set independently for each dimension of data. For example, the end user can have unconstrained content dimension, basis-constrained author dimension, and fixed time dimension in the same process.

Although the level of user's prior knowledge can be set independently for each data dimension, the NTF factorization is applied jointly among all the data dimensions. As a consequence, the facet matrix of each data dimension is dependent on all the data dimensions (e.g., a content topic depends on which communities discussed about the topic and when the discussion took place). Another consequence of this joint NTF factorization is that the core tensor captures the correlation among the facets in all the data dimensions and it allows different numbers of facets if different data dimensions. In contrast, conventional systems only analyze pair-wise relations among pairs of data dimensions.

The system determines a connection between a model and a probabilistic generative procedure. The data characteristics can be extracted by using the model to tasks such as detecting salient communities, coherent topics, and noteworthy temporal trends in social networks. The system can apply the data characteristics extracted by using the model to applications such as organizing, searching, classifying, clustering, and visualizing the data in social networks.

The non-negative tensor factorization model can be used for extracting data characteristics from polyadic data. Prior knowledge can be incorporated at three different levels into the factorization and as a result, end users can control the process of characteristic extraction in different data dimensions at different levels. The new model takes the standard NTF as a special case. The model has a natural interpretation in a form of the probabilistic generative procedure. A Dirichlet prior can be used in the model parameter inference, and the sparseness of the results can be controlled by using a special Dirichlet prior. The system uses a highly efficient method that takes advantage of the sparseness of data, where the method has linear (per iteration) time complexity. The system also uses an efficient technique for fast computation when the application is selecting top-K answers.

Extensive experimental studies on these two data sets demonstrate that the framework of FIG. 1 effectively incorporates the users' prior knowledge, improves performance over the standard NTF on the task of personalized recommendation, and is scalable to large data sets from real-life applications.

Figure 2:
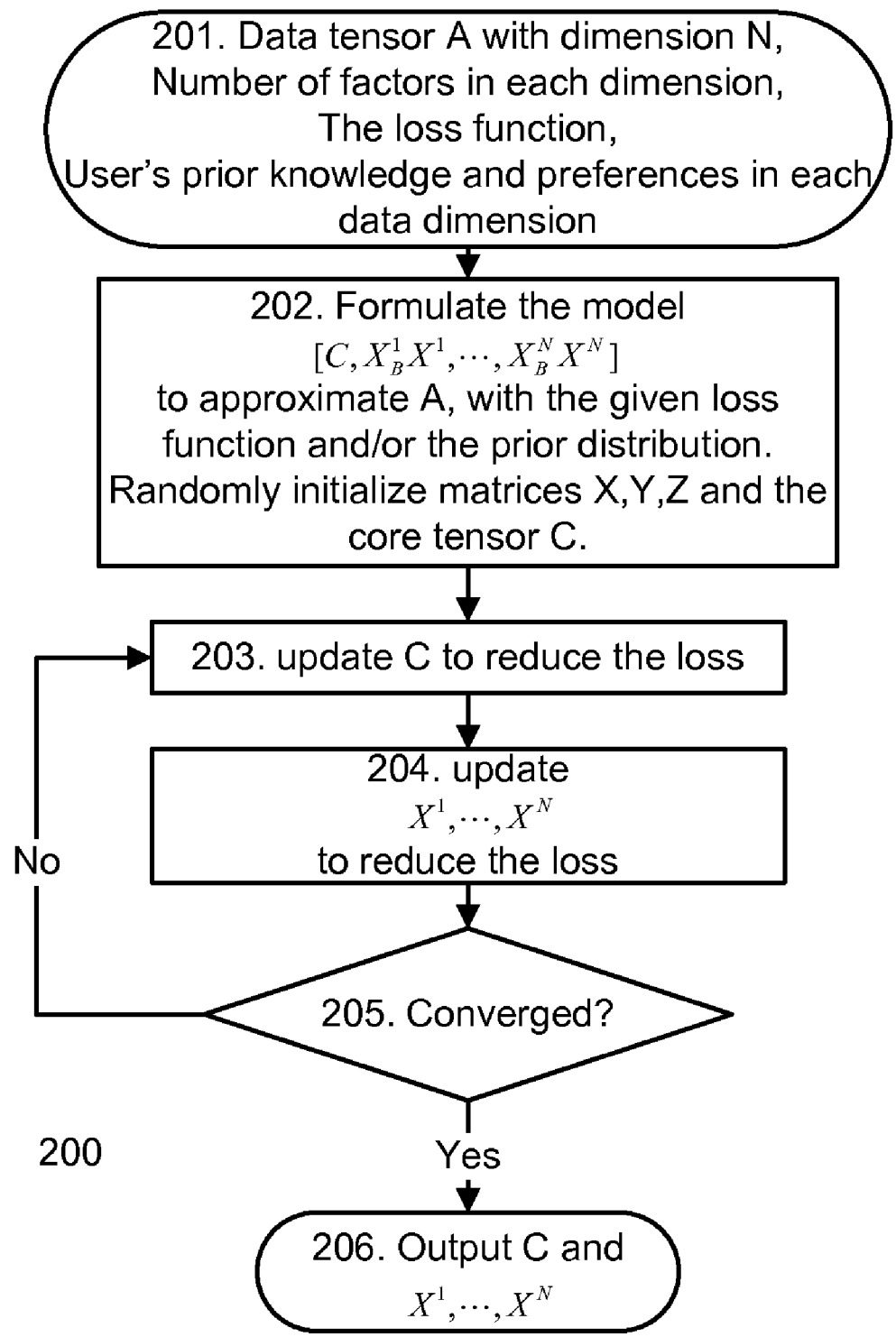

FIG. 2 shows in detail one implementation of box 103 (FIG. 1) in using the factorization method that incorporates the user's prior knowledge and preferences. In 201, the process receives as input the data tensor A from 102 (FIG. 1), the number of factors the user wants, the loss function, and user's prior knowledge and preferences in each data dimension. Next, in 202, the process formulates a model $[C, X_B^1 X^1, \ldots, X_B^N X^N]$, where $X_B^1 X^1, \ldots, X_B^N X^N$ are the factors in the first, the second, ..., and the N-th dimensions, C is the core tensor to capture the correlation among the factors $X_B^1 X^1, \ldots, X_B^N X_N$. The entries of $X_B^1, \ldots, X_B^N$ are nonnegative and they encode the user's prior knowledge. The entries of $X^1, \ldots, X^N$ are nonnegative also. The size of $X^1$ depends on the size of the i-th dimension of A, the size of the basis that the user used to indicate the prior knowledge, as well as the number of factors that the user wants in the i-th dimension. The entries of C are also nonnegative. The size of C depends on the number of factors that the user wants in all the dimensions. The loss between A and $[C, X_B^1 X^1, \ldots, X_B^N X^N]$ is the Kullback-Leibler divergence.

In 203, the process updates the core tensor C to reduce the loss. The details in the update of C are discussed in more detail in the Provisional Application, the content of which is incorporated by reference. In 204, the process updates $X^1, \ldots, X^N$ to reduce the loss. In one embodiment, the update rule for X can be processed by the following pseudo-code:

---

Algorithm for updating X

▷ input: B as {<key1,key2,key3,v>},X,Y,Z,C,$X_B$
▷ output: updated X
1: k ← −1, j ← −1, i ← −1, E ← 0;
2: for each entry <key1,key2,key3,v> of B do
3:     if k ≠ key3
4:        k ← key3, j ← −1;
5:        construct D s.t. $D_{lm} \leftarrow \Sigma_n Z_{kn} C_{lmn}$;
6:     if j ≠ key2
7:        j ← key2;
8:        construct $\vec{d}$ s.t. $(\vec{d})_l \leftarrow \Sigma_m Y_{jm} D_{lm}$;
9:     i ← key1;
10:     $E_{row_i} \leftarrow E_{row_i} + v \cdot \vec{d}^T$;
11: $X \leftarrow_1 X \circ (X_B^T E)$;
12: return X;

---

In 205, the process checks for convergence and repeat 203 and 204 until the loss converges below a predetermined value. In 206, the process returns the core tensor C and the factors $X^1, \ldots, X^N$ as the output.

Figure 3:
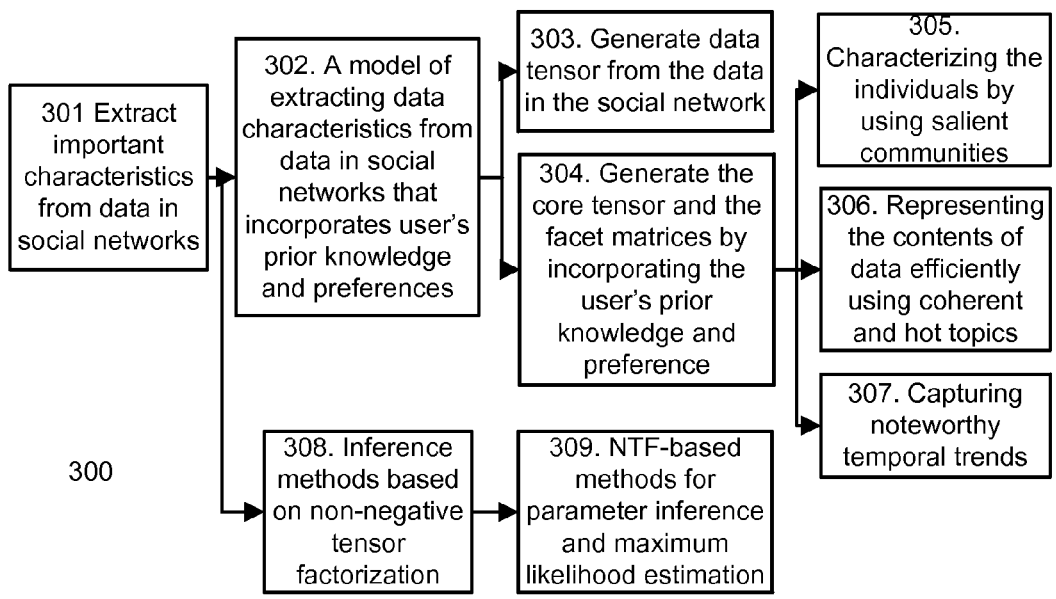

FIG. 3 shows an exemplary process that extracts important characteristics from data in social networks (301). The process generates a model to extract data characteristics from data in social networks that incorporates user's prior knowledge and preferences (302), and then applies corresponding inference methods based on non-negative tensor factorization (308). From 302, the process generates data tensor from the data in the social network by putting the data into a high-dimensional tensor, where each dimension corresponds to one aspect of the data (303). The process can also generate the core tensor and the facet matrices by incorporating the user's prior knowledge and preference (304). From 304, the process can apply the obtained core tensor and the facet matrices for characterizing the individuals by using salient communities (305). The process can also apply the obtained core tensor and the facet matrices for representing the contents of data efficiently using coherent and hot topics (306). Alternatively, the process can apply the obtained core tensor and the facet matrices for capturing noteworthy temporal trends (307).

In 308, the process can use corresponding inference methods based on non-negative tensor factorization and then apply the non-negative tensor factorization based methods for parameter inference and maximum likelihood estimation (309).

The system benefits from three factors. First, the system exploits the general condition that data in real applications are usually sparse. For example, not every blogger uses every word in every of his or her posts. Because A is a sparse tensor, not every entry of [C,X,Y,Z] is needed. In the implementation, the data sparseness is beneficially used by computing base transforms in an on-demand fashion. For example, it only takes time $O(n_z \cdot L^3)$ to compute the entries in [C,X,Y,Z] that correspond to the non-zero entries in A, where $n_z$ is the total number of non-zero entries in A.

The second factor is that the update rules involve many nested summations and multiplications that have a lot of structures. The system carefully orders these nested operations and cache the intermediate results to avoid generating them multiple times. In one embodiment, the system pushes certain summations inside the nest $$B_{ijk} = A_{ijk} \Big/ \sum_l X_{il} \left( \sum_m Y_{jm} \left( \sum_n Z_{kn} C_{lmn} \right) \right).$$

In the above expression, for entries with the same k index, the term in the inner parentheses can be reused even when the i and j indices vary; similarly, for entries with the same j and k indices, the term in the outer parentheses can be reused even when the i index varies. Similarly, $$[B, X^T, Y^T, Z^T]_{lmn} = \sum_k Z_{kn} \left( \sum_j Y_{jm} \left( \sum_i X_{il} B_{ijk} \right) \right).$$

$$\langle B \times_1 X_B^T, [C, \cdot, Y, Z] \rangle = X_B^T \langle B, [C, \cdot, Y, Z] \rangle$$

and $$\langle B, [C, \cdot, Y, Z] \rangle_{il} = \sum_{jk} B_{ijk} \left( \sum_m Y_{jm} \left( \sum_n Z_{kn} C_{lmn} \right) \right)$$

As a result, the system can reuse intermediate computation results in all the update rules, since A is stored with key3 (the k index) as the major key and then key2 (the j index) and then key1 (the i index) as the minor keys. The sorting of A does affect the time complexity for two reasons. On the one hand, the indices i, j, and k are positive integers with known upper-bounds and so a linear sorting algorithm, such as bucket sort, can be applied. On the other hand, A only has to be sorted once before the iterative process starts and so the sorting cost is amortized among multiple iterations. It is worth mentioning that B, which is also sparse, does not have to be explicitly sorted—it is automatically sorted because of the way it is derived from the sparse tensor A.

The third factor that the system takes advantage of is that different data dimensions usually have different cardinalities. For example, if the time unit is a day, then the size of the time dimension can be much smaller than of the blogger dimension. By ordering the computation in such a way that the dimension of the smallest size is put in the inner parentheses, if A is sorted accordingly at the beginning. Experimental studies show that this re-ordering makes large difference in the processing.

Next, a fast computation embodiment for top-K queries is discussed. In many recommendation applications, instead of interested in the ranks of the whole list of candidates, the end users often are only interested in a quick answer to the top-K queries. For example, the query may be "Who are the top 3 bloggers mostly involved in a topic during a given time period?" or "What are the top 10 references that are mostly relevant to a group of authors who plan to co-author a paper on a set of keywords?". Because in many applications such queries must be answered in real time, fast computation of top-K answers becomes crucial. In the implementation of the framework, the system derives the exact top-K answers without computing the scores of all the candidates for the recommendation. The process uses Fagin's algorithm which has been extensively used in the database field for answering fuzzy queries over multimedia databases. For Fagin's algorithm to work, a key requirement is that the score function must be monotonic. A function $f(z_1, \ldots, z_N)$ is monotonic if $\{z'_1 \geq z_1, \ldots, z'_N \geq z_N\}$ implies that $f(z'_1, \ldots, z'_N) \geq f(z_1, \ldots, z_N)$. It turns out that the ranking function satisfies this condition of monotonicity.

To illustrate, the above query of recommending references to a given set of authors on a given set of keywords can be used. In this example, X, Y, and Z correspond to author, keyword, and reference, and $X_B$, $Y_B$, and $Z_B$ are the corresponding basis.

$A \equiv [C, X_B X, Y_B Y, Z_B Z]$ and so for a set of authors and a set of keywords, the relevances of the references are $[C, \vec{x}^T, \vec{y}^T, Z_B Z] = (Z_B Z) \cdot [C, \vec{x}^T, \vec{y}^T, I_N]$, where the k-th row of the result indicates the relevance of the k-th reference. Because $\vec{x}^T$ and $\vec{y}^T$ are obtained by aggregating the given set of authors and the given set of keywords, respectively, entries in $\vec{c} = [C, \vec{x}^T, \vec{y}^T, I_N]$ are non-negative. Because $Z_B Z$ is also non-negative, the score function $f[(Z_B Z)_{row_k}] = (Z_B Z)_{row_k} \cdot \vec{c}$ is a monotonic function and the determination of the top-k queries can be done using Fagin's algorithm.

The framework turns out to have a natural probabilistic interpretation in that it is equivalent to a special probabilistic generative model. Focusing on the basis-constrained dimension and using the blog data as an example, assuming the observed data are in a list in the form of $\{\langle \text{blogger i, word j, time k}, A_{ijk}\rangle\}$. the following probabilistic generative procedure describes how the observed data are sampled:

1. select a community l, a topic m, a temporal trend n, with probability $c_{lmn}$ (this corresponds to an entry of the core tensor C), 2. conditioning on the result in step 1, select a sub-community l', a sub-topic m', a sub-trend n', following p(l'|l), p(m'|m), and p(n'|n) (these correspond to the l-th, m-th, and n-th columns of X, Y, and Z, respectively), 3. conditioning on the results in step 2, select a blogger i, a word j, a time stamp k, following p(i|l'), p(j|m'), and p(k|n') (these correspond to the l'-th, m'-th, and n'-th columns of $X_B$, $Y_B$ and $Z_B$, respectively).

Then under this generative model, the log-likelihood of the data can be written as $$\sum_{ijk} A_{ijk} \log\left(\sum C_{lmn} p(l'|l) p(m'|m) p(n'|n) p(i|l') p(j|m') p(k|n')\right)$$

where the inner sum is computed over all l, m, n, l', m', n'. A simple derivation can show that maximizing the log-likelihood is equivalent to minimizing the KL loss and as a consequence, the framework is equivalent to this probabilistic generative model.

The probabilistic interpretation, other than giving additional insights to the framework, provides the underpinning for certain extensions of the basic framework. Such an extension can consider a maximum a posteriori (MAP) estimation for the basic probabilistic model. Here, using the Dirichlet distribution as the prior distribution of the parameters, the prior for X is determined. The prior of each column of X is a Dirichlet distribution with hyper-parameter $\alpha_X > 0$. The logarithm of the prior probability is $$\ln P(X) = (\alpha_X - 1) \sum_{il} \ln X_{il} + c_X,$$

where $c_X$ is a value irrelevant to X. Similarly, assuming the priors for Y, Z and C are all Dirichlet distributions, with hyper-parameters $\alpha_Y$, $\alpha_Z$, and $\alpha_C$ respectively, the logarithm of the error for the MAP estimation is that for the MLE plus the logarithm of the prior probabilities:

$$\text{error}_{MAP} = \text{errors}_{KL} - \ln P(X) - \ln P(Y) - \ln P(Z) - \ln P(C).$$

To solve the MAP estimation, the following update rules are guaranteed to converge to an optimal solution to the objective function described above:

$$B \leftarrow A/[C, X_B X, Y_B Y, Z_B Z],$$

$$C \leftarrow {}_0[C \circ \langle B, [\bullet, X_B X, Y_B Y, Z_B Z] \rangle + (\alpha_C - 1)]_\epsilon,$$

$$X \leftarrow {}_1[X \circ \langle B \times_1 X_B^T, [C, \bullet, Y_B Y, Z_B Z] \rangle + (\alpha_X - 1)]_\epsilon,$$

$$Y \leftarrow {}_1[Y \circ \langle B \times_2 Y_B^T, [C, X_B X, \bullet, Z_B Z] \rangle + (\alpha_Y - 1)]_\epsilon,$$

$$Z \leftarrow {}_1[Z \circ \langle B \times_3 Z_B^T, [C, X_B X, Y_B Y, \bullet] \rangle + (\alpha_Z - 1)]_\epsilon.$$

where $\epsilon$ is a small positive real number and $[\bullet]_\epsilon$ stands for taking the maximal one between the variable value and $\epsilon$.

The system extends the standard non-negative tensor factorization for extracting data characteristics from polyadic data. The framework allows end users great flexibility in incorporating their prior knowledge at different levels in the process of characteristic extraction.

The system extracts data characteristics from data in social networks that allows the end users to incorporate prior knowledge and preferences at different levels. The corresponding inference method is used for obtaining the optimal solutions. The framework of FIGS. 1-3 extends non-negative tensor factorization so that the data characteristics are extracted within the search space determined by the user prior knowledge. As a result, the extracted data characteristics are guaranteed to meet the end users' requirement and existing prior approaches are not able to offer such a guarantee.

Figure 4:
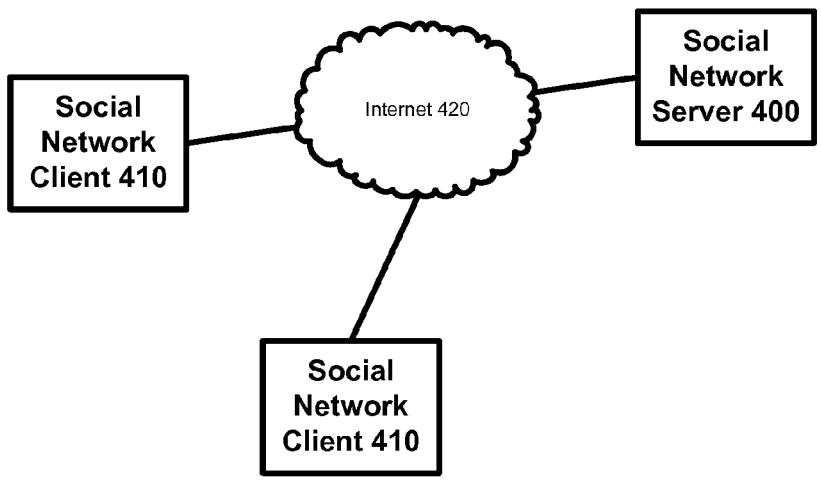

FIG. 4 shows an exemplary social network site supported by a social network server 400 communicating with a plurality of social network clients 410 over the Internet 420. The clients 410 can find friends and make connections on social-networking sites by inviting friends to join; searching for friends who are already members, or finding interesting people and ask them to join hands on the social network. The social-networking site allows members to send e-mails inviting friends to join the Web site and automatically become part of the online social network. Some social-networking sites, like Facebook and LinkedIn, allow members to upload the address book from Webmail accounts like Yahoo!, Gmail and AOL and send invites to all contacts at once.

The social-networking site can also allow members to search by keyword or tags. Tags are user-created keywords that can be attached to any piece of content—a photo, a message board post, a video, a Web page—that allows people to know more about it. On a photo-sharing site like Flickr, for example, it's possible to search by tags such as "cat," "music" and "sunset." If the member finds a tagged video, photo or message board post that s/he likes, the member can follow the link to the user's profile, find out more about them (and their friends) and even ask them to join his or her network.

The server 400 of FIG. 4 runs the processes of FIGS. 1-2 and takes in to consideration the end users' preferences and extracts characteristics from the raw data only. The system ensures that the extracted characteristics to meet the end users' preferences. The server 400 of FIG. 4 can be used in tasks such as detecting salient communities, coherent topics, and noteworthy temporal trends in social networks. Other applications include organizing, searching, classifying, clustering, and visualizing the data in social networks.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. IPO controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A computer-implemented method to analyze a social network, comprising
   a. generating a data tensor from social networking data;
   b. applying a non-negative tensor factorization (NTF) with user prior knowledge and preferences to jointly extract a core tensor and facet matrices; and
   c. rendering information about the social network based on the core tensor and facet matrices, and
   d. providing a plurality of levels of user inputs for each dimension of the data, including unconstrained, basis-constrained, and constant.

2. The method of claim 1, comprising transforming the data into a high-dimensional tensor, where each dimension of the tensor corresponds to one aspect of the data.

3. The method of claim 1, wherein each entry of the data tensor corresponds to an observed piece of data in the social network.

4. The method of claim 3, wherein an index for a dimension is unordered or ordered.

5. The method of claim 3, wherein each data tensor entry represents an intensity of the corresponding entry in the social networking data with a fixed set of indices in the dimension.

6. The method of claim 1, comprising applying the NTF for parameter inference and maximum likelihood estimation.

7. The method of claim 1, comprising incorporating prior knowledge at different levels into the factorization to control the facets in different dimensions of the data at different levels.

8. The method of claim 1, wherein the user input level is set independently for each dimension of data.

9. The method of claim 1, comprising applying a Dirichlet prior in a model parameter inference.

10. The method of claim 9, comprising controlling a sparseness or smoothness of the NTF by using special Dirichlet priors.

11. The method of claim 1, applying the NTF to select one or more communities in the social network.

12. The method of claim 1, comprising applying the NTF to select one or more topics in the social network.

13. The method of claim 1, comprising applying the NTF to detect one or more temporal trends in the social network.

14. The method of claim 1, comprising applying the NTF to organizing, searching, classifying, clustering, or visualizing data in the social network.

15. The method of claim 1, comprising generating a mode $[X_B^1 X^1, \ldots, X_B^N X^N]$, where $X_B^1 X^1, \ldots, X_B^N X^N$ are the first, second, . . . , and N-th dimensions, C is the core tensor to capture the correlation among the factors, $X_B^1 X^1, \ldots, X_B^N X^N$.

16. The method of claim 15, wherein $X_B^1, \ldots, X_B^N$ are nonnegative and encode user prior knowledge.

17. The method of claim 15, wherein $X_B^1, \ldots, X_B^N$ are nonnegative.

18. The method of claim 15, wherein a loss between the data tensor and $[C, X_B^1 X^1, \ldots, X_B^N X^N]$ comprises Kullback-Leibler divergence.

19. The method of claim 1, wherein the data tensor comprises three or more dimensions.

20. A computer-implemented method to analyze a social network, comprising
   a. generating a data tensor from social networking data;
   b. applying a non-negative tensor factorization (NTF) with user prior knowledge and preferences to jointly extract a core tensor and facet matrices; and
   c. rendering information about the social network based on the core tensor and facet matrices, and
   d. generating a mode$[X_B^1 X^1, \ldots, X_B^N X^N]$, where $X_B^1 X^1, \ldots, X_B^N X^N$ are the factors in first, second, ..., and N-th dimensions, C is the core tensor to capture the correlation among the factors, $X_B^1 X^1, \ldots, X_B^N X^N$.

* * * * *